(12) United States Patent
Sakamoto (10) Patent No.: US 9,031,420 B2
(45) Date of Patent: May 12, 2015

(54) DIGITAL OPTICAL COHERENT TRANSMISSION DEVICE

(71) Applicant: Fujitsu Limited, Kawasaki-shi (JP)

(72) Inventor: Yuichirou Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 158 days.

(21) Appl. No.: 13/759,214

(22) Filed: Feb. 5, 2013

(65) Prior Publication Data

US 2013/0259487 A1  Oct. 3, 2013

(30) Foreign Application Priority Data

Mar. 28, 2012 (JP) .................. 2012-075172

(51) Int. Cl.
*H04B 10/06* (2006.01)
*H04B 10/50* (2013.01)
*H04B 10/61* (2013.01)

(52) U.S. Cl.
CPC ............ *H04B 10/50* (2013.01); *H04B 10/6165* (2013.01)

(58) Field of Classification Search
CPC .. H04B 10/61; H04B 10/611; H04B 10/6161; H04B 10/6162; H04B 10/6165; H04B 10/672
USPC .......................... 398/202, 204–206, 208–210
See application file for complete search history.

(56) References Cited

U.S. PATENT DOCUMENTS

| | | | |
|---|---|---|---|
| 8,068,742 B2 * | 11/2011 | Cole et al. ...................... | 398/152 |
| 2007/0147850 A1 * | 6/2007 | Savory et al. ................. | 398/208 |
| 2008/0267638 A1 * | 10/2008 | Nakashima et al. .......... | 398/208 |
| 2009/0214201 A1 | 8/2009 | Oda et al. | |
| 2010/0209121 A1 * | 8/2010 | Tanimura ...................... | 398/202 |
| 2011/0229127 A1 | 9/2011 | Sakamoto et al. | |
| 2013/0051809 A1 * | 2/2013 | Mehrvar et al. ............... | 398/208 |

FOREIGN PATENT DOCUMENTS

| | | |
|---|---|---|
| EP | 1959590 | 8/2008 |
| EP | 1962443 | 8/2008 |
| EP | 2221999 | 8/2010 |
| EP | 2224659 | 9/2010 |
| EP | 2357740 | 8/2011 |
| JP | 2006-352525 | 12/2006 |
| JP | 2009-198364 | 3/2009 |
| JP | 2010-080665 | 4/2010 |
| JP | 2010-226254 | 10/2010 |

OTHER PUBLICATIONS

Extended European Search Report dated Jul. 11, 2013 issued in corresponding European Patent Application No. 13153812.6.

* cited by examiner

*Primary Examiner* — Dalzid Singh
(74) *Attorney, Agent, or Firm* — Fujitsu Patent Center (57) ABSTRACT

An optical signal is converted into an electric signal by an O/E converter on the reception side, and converted into a digital signal by an analog/digital conversion unit. In a capture unit A at the input stage of the digital signal processing unit at the next stage, the constellation of a signal output from an analog/digital conversion unit is acquired for each polarization. According to the constellation information, the amplitude value of the electric signal input to the analog/digital conversion unit is corrected so that the value is optimum. Also, the capture unit B acquires the constellation on the signal after the demodulation by the digital signal processing. According to the constellation information, the amplitude of the I and Q signals and the skew between the I and Q signals are corrected.

7 Claims, 12 Drawing Sheets

RELATIONSHIP BETWEEN
SIGNAL AND ADC SAMPLING
(a)

CONSTELLATION MAP
(EXAMPLE OF SHIFT BY SKEW)
(b)

FIG. 12

DIGITAL OPTICAL COHERENT TRANSMISSION DEVICE

CROSS-REFERENCE TO RELATED APPLICATIONS

This application is based upon and claims the benefit of priority of the prior Japanese Patent Application No. 2012-075172, filed on Mar. 28, 2012, the entire contents of which are incorporated herein by reference.

FIELD

The following embodiments are related to a digital optical coherent transmission device.

BACKGROUND

With increasing traffic in a communication circuit, the signal transmission speed of a trunk line optical transmission system has become higher year by year, and an increasing number of requests to implement a 100 Gbps next-generation optical transmission system have been issued lately.

When a signal transmission speed becomes higher, there occurs the problem that the degradation of signal quality develops by each of the factors of:
1) the reduction of the tolerancce relating to an optical signal to noise ratio;
2) an insufficient band of the wavelength filter during the WDM (wavelength division multiplexing) transmission;
3) the wavelength dispersion of a transmission line, a waveform distortion by a nonlinear effect, etc.

One of the means for solving the problems is a digital optical coherent transmission system which has recently attracted attention as an improvement of the tolerance against the waveform distortion of an OSNR and a transmission line (D. Ly-Gagnon, IEEEE JLT, pp. 12-21, 2006).

Figure 1:
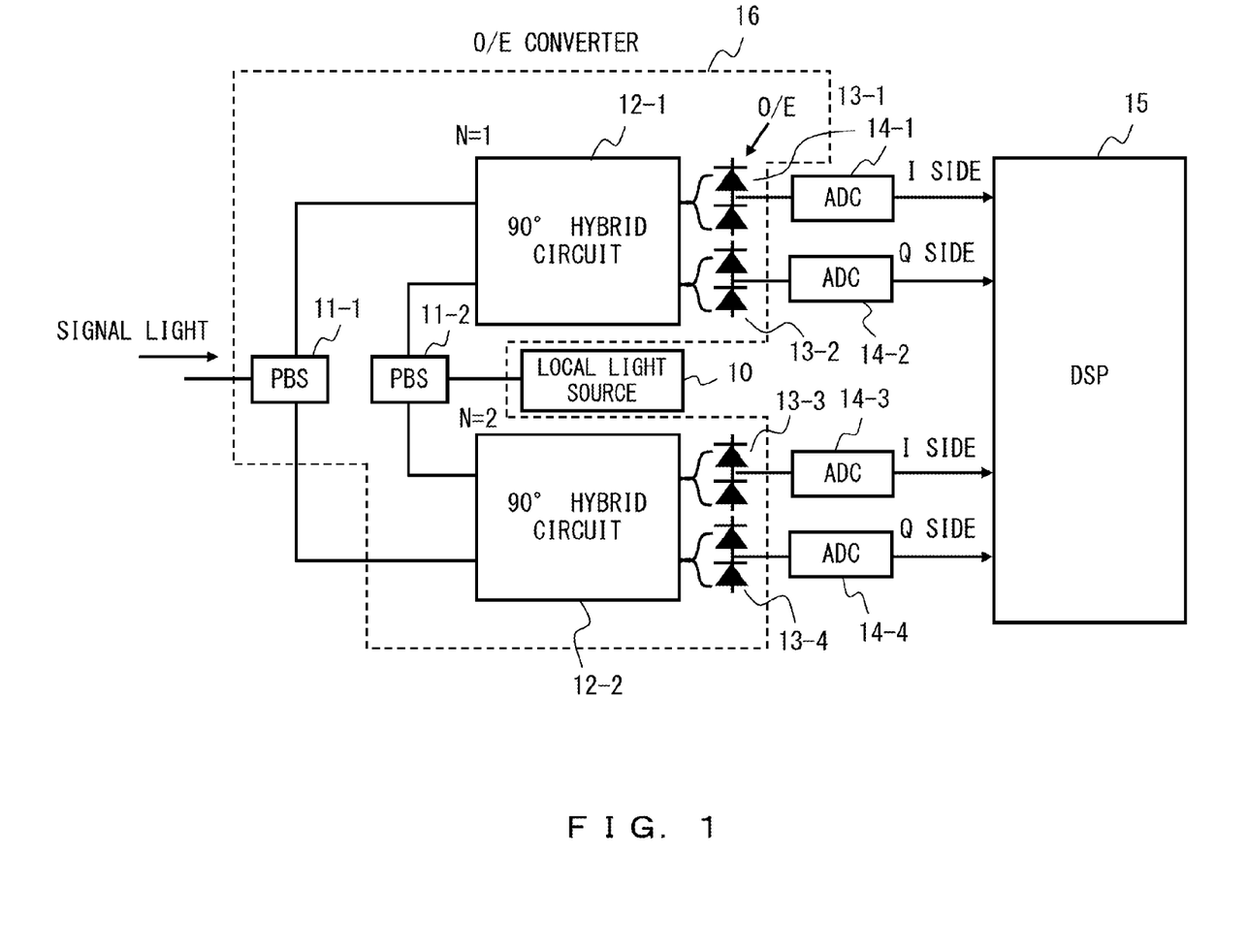
FIG. 1 is an example of a configuration of a digital optical coherent receiver.

FIG. 1 is an example of a configuration of a digital optical coherent receiver.

In FIG. 1, the digital optical coherent receiver detects signal light and local light from a local light source 10 at 90° hybrid circuits 12-1 and 12-2 after splitting the light into each polarizing axis through polarization beam splitters 11-1 and 11-2. O/E converters (optical/electrical converters) 13-1 through 13-4 are provided to convert an optical signal corresponding to the amplitude and the phase of the optical signal output from the 90° hybrid circuits 12-1 and 12-2 into an electric signal. Additionally, A/D converters 14-1 through 14-4 for quantizing an electric signal are provided, and a DSP (digital signal processor) 15 is provided to compensate for a waveform distortion and demodulate a signal using quantized digital data. Thus, the polarization beam splitters 11-1 and 11-2, the 90° hybrid circuits 12-1 and 12-2, and the O/E converters 13-1 through 13-4 configure an O/E converter 16 (an O/E converter corresponding to 25 (FIG. 9) on the receiving side).

Unlike the system of performing direct detection by assigning the ON/OFF state of the conventional optical intensity mainly by the 10 Gbps optical transmission system, the digital optical coherent transmission system extracts the optical intensity and the phase information by the coherent transmission system. Then, by quantizing the extracted optical intensity and the phase information by the ADC, the digital signal processing circuit demodulates them. Therefore, the present invention corresponds to a multivalued modulation system such as M-ary PSK (phase shift keying), QAM (quadrature amplitude modulation), etc. and a frequency division multiplexing system such as FDM (frequency division multiplexing), OFDM (orthogonal frequency division multiplexing), etc.

One of the degradation factors of the signal quality of the digital optical coherent receiver is amplitude variance of a signal of each channel. The factor of the occurrence of the variance of the signal amplitude of each channel may be a difference of an individual component such as an electric line forming the route of each channel, a 90° hybrid circuit, an O/E, etc. When the amplitude of each signal deviates from the optimum state in the ADC input stage, there occurs an influence on the quality of the A/D converted signal in the ADC.

Figure 2:
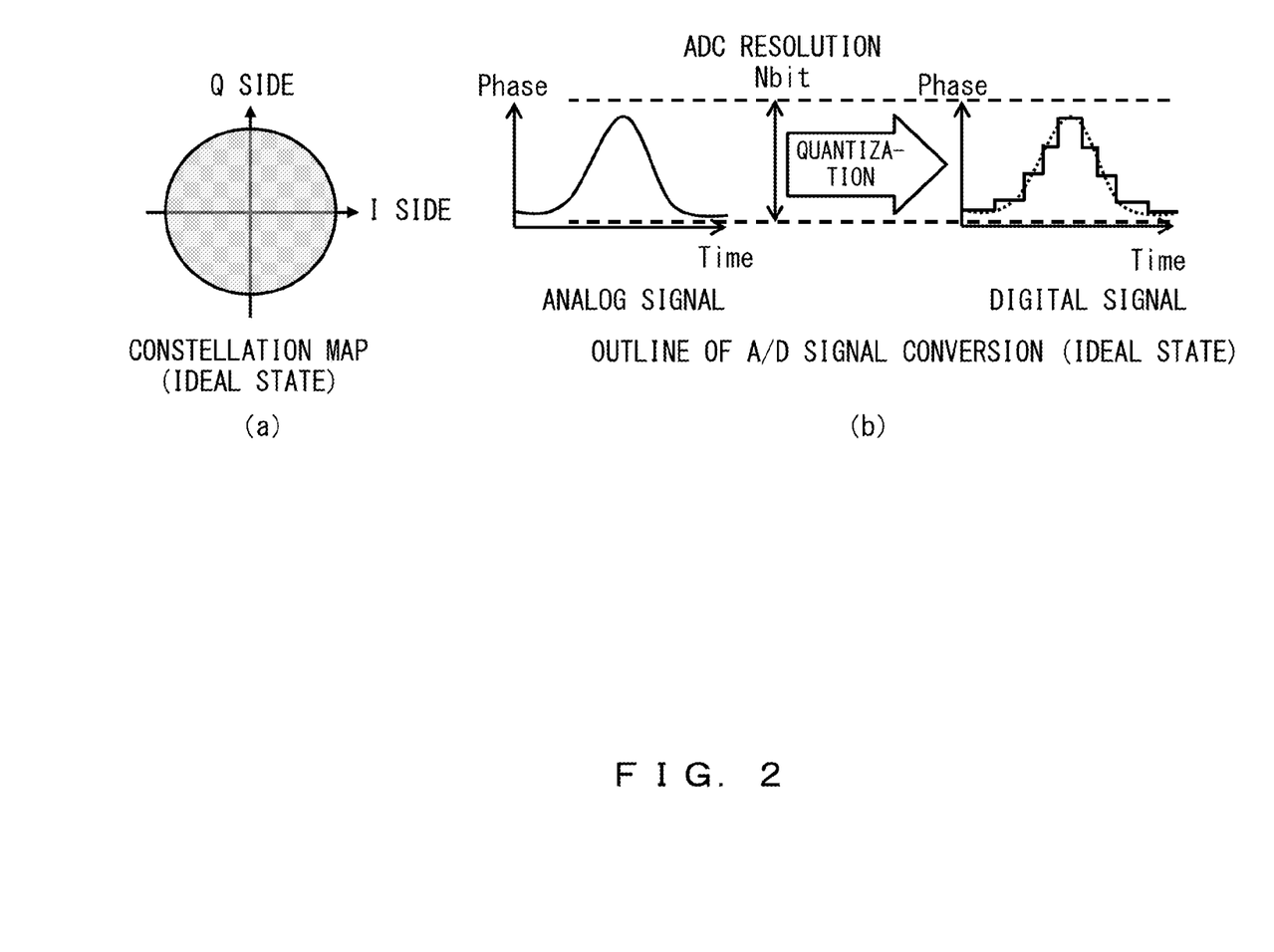
FIG. 2 is a view (1) illustrating the relationship between the quality of the A/D converted signal and the ADC input signal amplitude.
Figure 3:
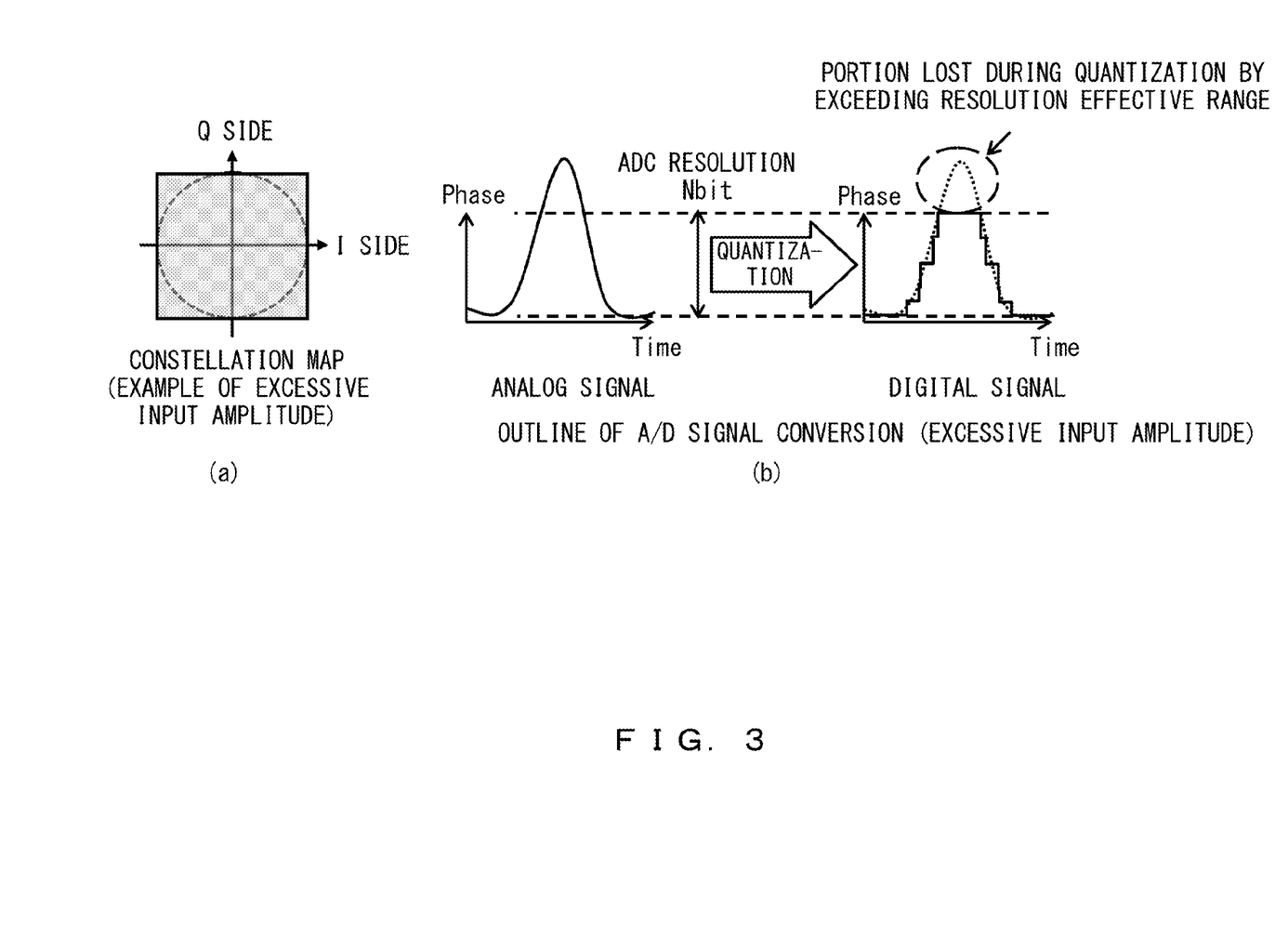
FIG. 3 is a view (2) illustrating the relationship between the quality of the A/D converted signal and the ADC input signal amplitude.
Figure 4:
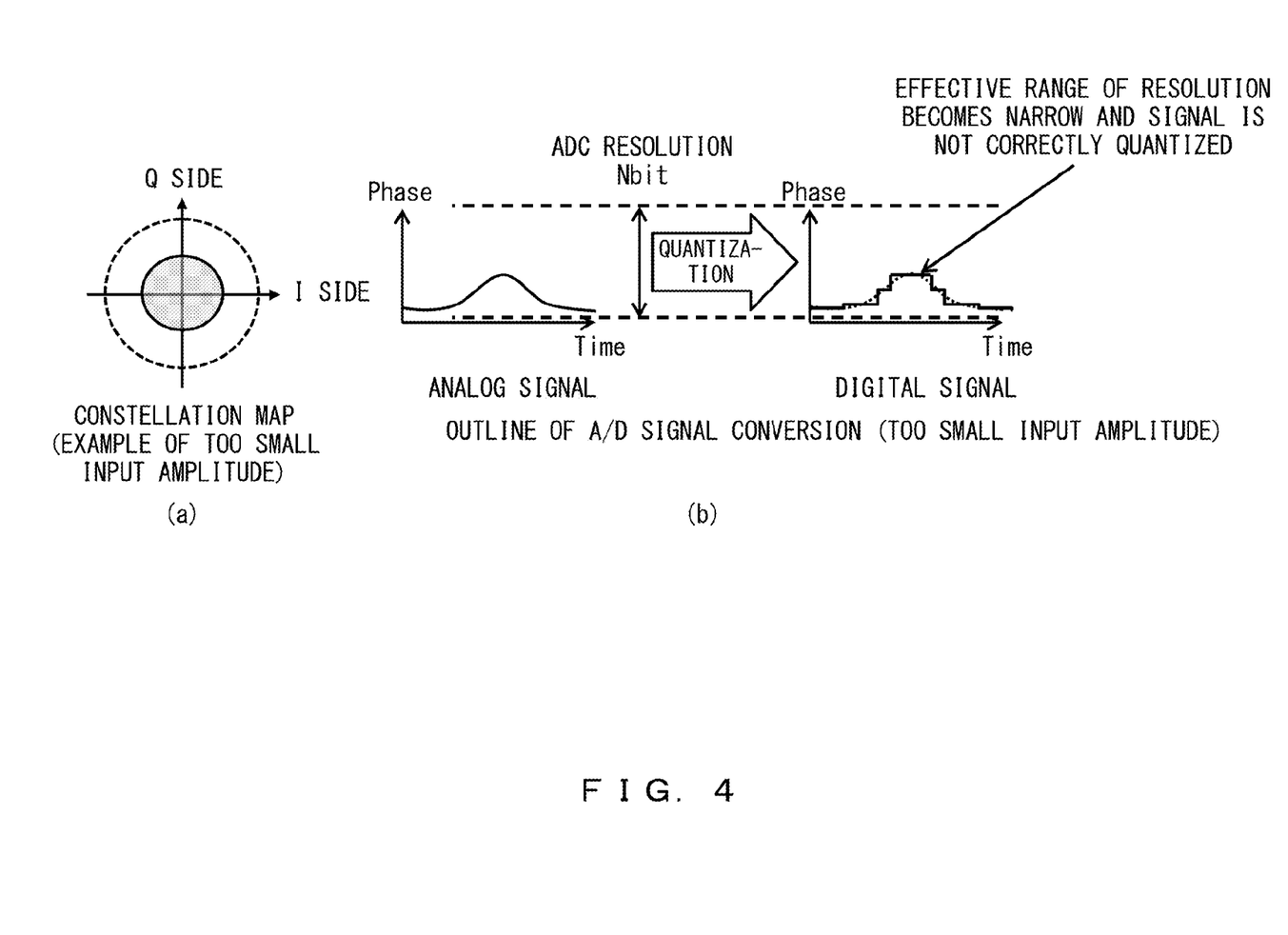
FIG. 4 is a view (3) illustrating the relationship between the quality of the A/D converted signal and the ADC input signal amplitude.

FIGS. 2 through 4 illustrate the relationship between the quality of an A/D converted signal and the amplitude of an ADC input signal.

In these figures, an example in the DP-QPSK (dual polarization-quadrature phase shift keying corresponding to the 4 QAM of the number of polarization multiplexing N=2).

FIGS. 2 and 3 illustrate the difference by the presence/absence of the variance of the signal amplitude between an in-phase (I) signal and a quadrature (Q) signal. Relating to the arrangement of the signal on the IQ constellation map, FIG. 2 illustrates in the part (a) the ideal state of the IQ signal, and FIGS. 3 and 4 illustrate in the respective parts (a) the state in which there occurs a variance of signal amplitude.

The outline of the A/D conversion of a signal in each state in FIGS. 2, 3, and 4 in their respective parts (a) is illustrated in FIGS. 2, 3, and 4 in their respective parts (b).

FIG. 2 illustrates in the part (a) the ideal state in which the signal amplitude is appropriately input as an ADC input amplitude between the I and the Q signals. As illustrated in the part (b) of FIG. 2, since the amplitude of the input signal is in an appropriate range with respect to the range of the resolution of the ADC, the signal information is not largely impaired even after the signal is quantized as a digital signal.

FIG. 3 illustrates the excessive stage of the signal amplitude in the part (a). When the signal amplitude is excessive, the amplitude is expressed as a rectangular shape on the constellation map. That is, the I and Q signals exceed the upper limit of the output of the ADC, and are limited. Therefore, the signal is cut at a value in the I and Q directions. As illustrated the part (b) of FIG. 3, since the signal information in the area in which the input signal exceeds the range of the resolution of the ADC is lost during the quantization, there occur the sensitivity degradation of the ADC and the erroneous determination in the digital signal processing as a result.

FIG. 4 illustrates in the part (a) the state in which the signal amplitude is excessively small. As illustrated the part (b) of FIG. 4, since the effective area of the resolution of the ADC becomes smaller, the signal information is lost during the quantization, and there occur the sensitivity degradation of the ADC and the erroneous determination in the digital signal processing as a result as in the case of the excessive amplitude.

In addition, another factor of the degradation of the signal quality is skew (delay time difference) between the signals of each channel. As with the above-mentioned variance of the amplitude, the factor of the occurrence of the skew may be the individual difference of each of the components such as the electric line for the route of each channel, the 90° hybrid circuit, the O/E, the ADC, etc. up to the input stage of the DSP (digital signal processor). When there is the skew between the signals, there occurs an influence on the quality of the signal regenerated in the DSP.

Figure 5:
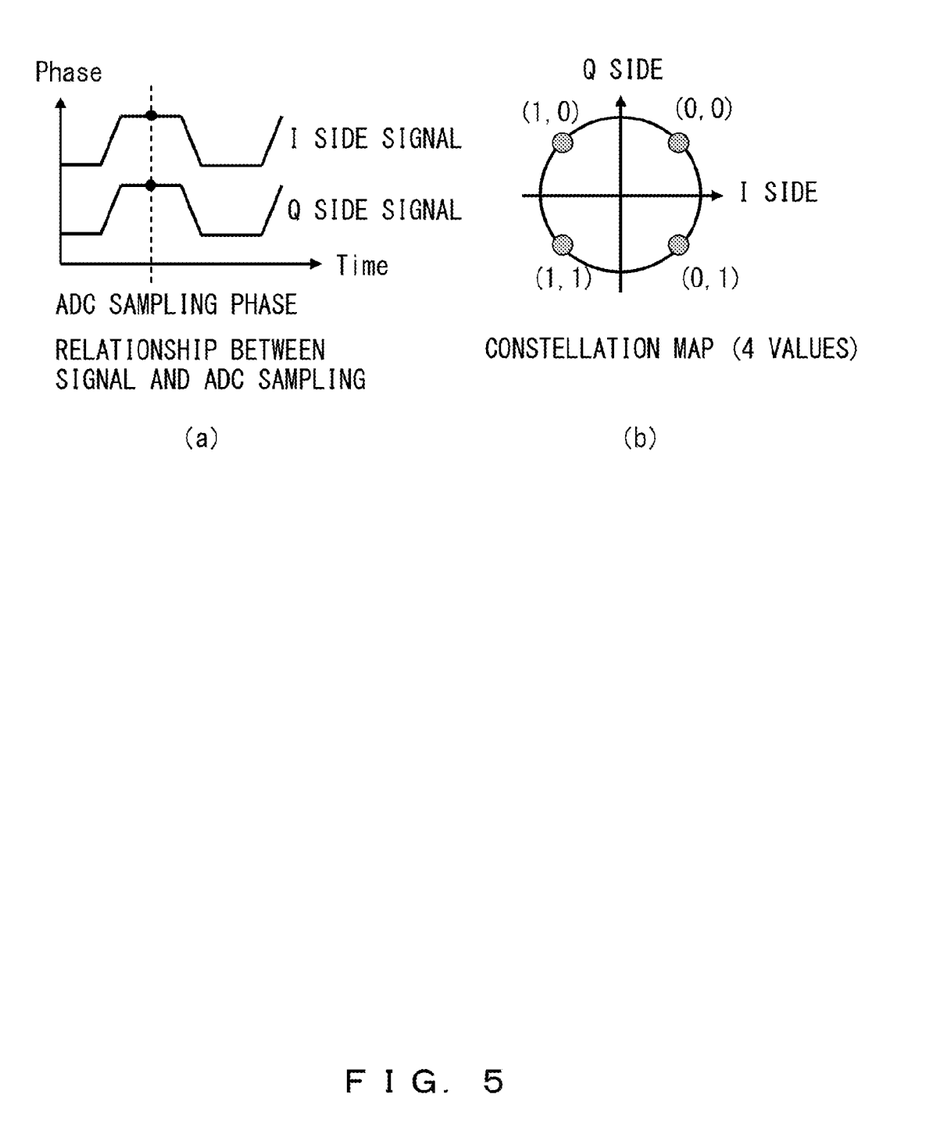
FIG. 5 is a view (1) illustrating the relationship between the regeneration quality of a signal and skew.
Figure 6:
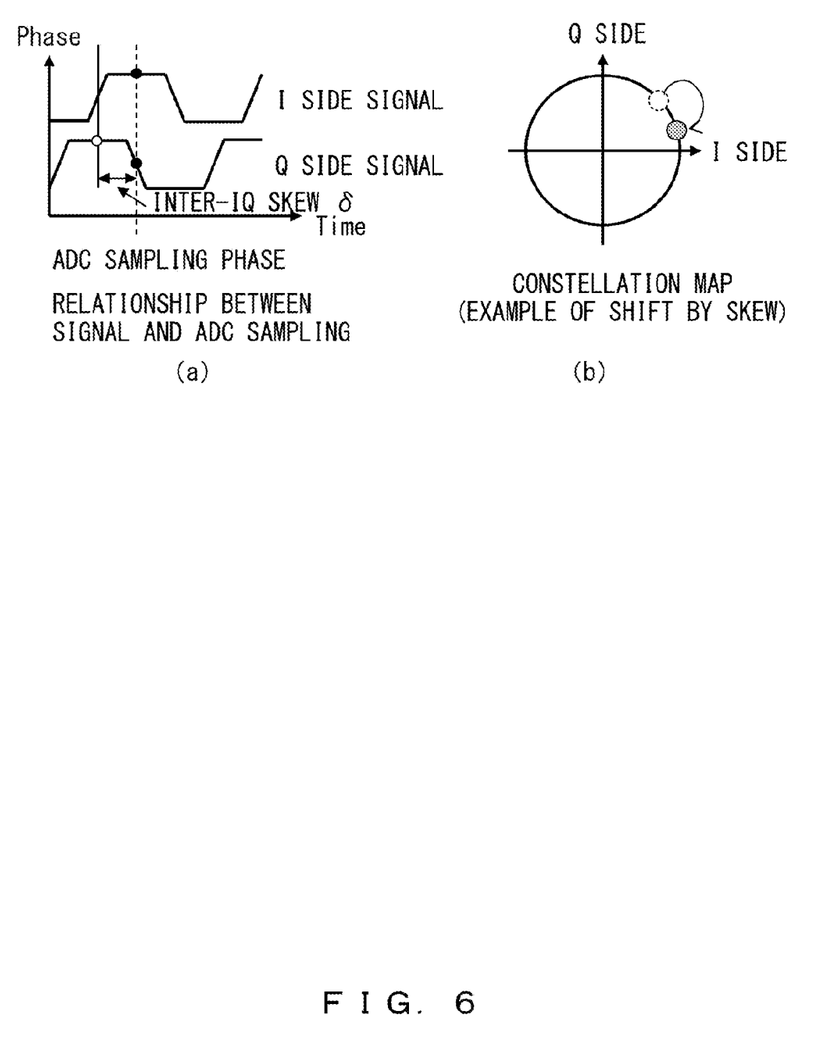
FIG. 6 is a view (2) illustrating the relationship between the regeneration quality of a signal and skew.

FIGS. 5 and 6 illustrate the relationship between the regeneration quality of a signal and the skew. In this example, the DP-QPSK system is exemplified.

FIGS. 5 and 6 illustrate the difference by the presence/absence of the skew between the I and Q signals. The parts (a) of FIGS. 5 and 6 exemplify the timing relationship between each signal and the ADC sampling. The parts (b) of FIGS. 5 and 6 exemplify the arrangement of the signals on the IQ constellation map.

FIG. 5 illustrates an ideal state indicating no skew between the I and Q signals. As illustrated in the part (a) of FIG. 5, each of the I and Q signals is sampled with the same phase timing in the ADC, and the signal point is arranged at four points by the combination of the phase state as illustrated in the part (b) of FIG. 5.

FIG. 6 illustrates the case in which there occurs the skew between the I and Q signals. As illustrated in the part (a) of FIG. 6, when the Q signal is behind the I signal by $\delta$, it is sampled with the timing deviating from the point at which the sampling is to be performed (white point in the part (a) of FIG. 6). In this case, the signal is arranged at a point different from the original position as illustrated in the part (b) of FIG. 6.

SUMMARY

The digital optical coherent transmission device according to an aspect of the present embodiment is a device in an optical transmission system using a multivalued modulation method or a frequency division multiplexing method is provided with: an O/E converter which optical-coherent-receives a received optical signal and converts the optical signal into an electric signal; an analog/digital conversion unit which converts the electric signal from the O/E converter into a digital signal; a first constellation acquisition unit which acquires first constellation information for the output digital signal of the analog/digital conversion unit; and an amplitude control unit which controls amplitude of the electric signal from the O/E converter when it is determined according to the first constellation information that the amplitude of the output digital signal is not appropriate.

The following embodiments may provide a digital optical coherent transmission device capable of improving the degradation of signal quality.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the present embodiment, the information about the constellation map of a signal is acquired at the input stage of the signal from the ADC to the digital signal processing unit and the output stage of the digital signal processing unit, and the amplitude of the signal and the skew are corrected using the information.

Figure 7:
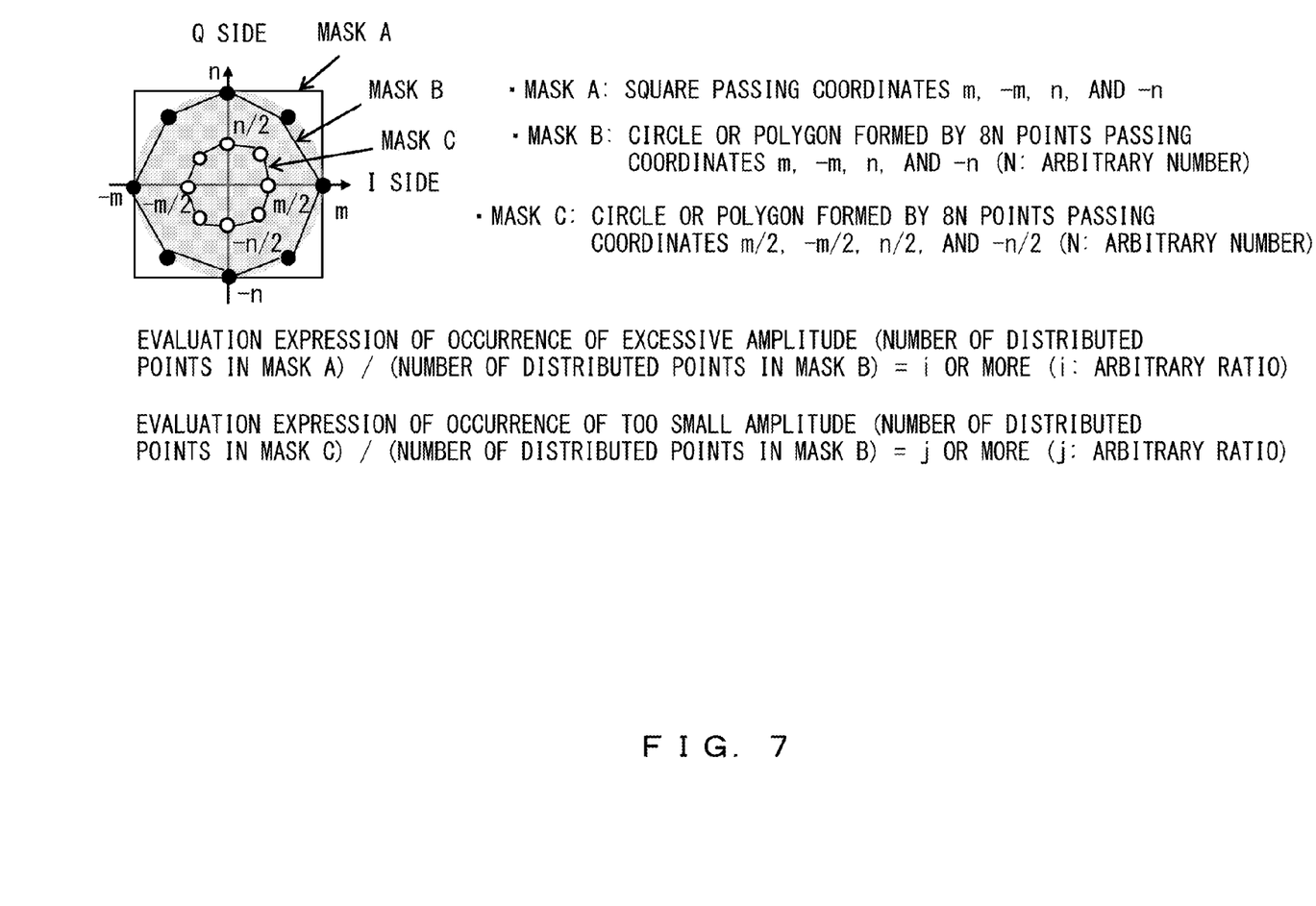
FIG. 7 is an example of the method of determining whether or not an A/D converted signal is in the optimum range on the constellation map.

FIG. 7 is an example of the method of determining whether or not an A/D converted signal is in the optimum range on the constellation map.

As illustrated in FIG. 7, a determination is made using three types of masks. The mask A indicates a square which passes the coordinates m, -m, n, and -n on the constellation map. In this example, m and n are output upper limit values of the I and Q signals of the ADC. The mask B indicates a circle which passes the coordinates m, -m, n, and -n or a polygon formed by 8N points on the constellation map. The mask C indicates a circle which passes the coordinates m/2, -m/2, n/2, and -n/2 or a polygon formed by 8N points on the constellation map (N indicates any number). Since a circle causes a complicated process in the digital processing, for example, an 8N polygon is used as a form approximate to a circle. However, since a circle is an ideal form, it is preferable that a circular mask is used if a circular mask is easily processed. In addition, although the coordinates of the mask C are values using m/2 and n/2, the values are not restricted, and the exemplified coordinates of m and n are expressed by m/2 and n/2 values.

The number of signal points distributed in each mask is counted, and the respective ratios are calculated. That is, (number of distributed points in mask A)/(number of distributed points in mask B) is used as a value for determination of the occurrence of an excessive amplitude, and (number of distributed points in mask C)/(number of distributed points in mask B) is used as a value for determination of the occurrence of a too small amplitude.

The closer to 1 the ratio of the number of distributed points in mask A to the number of distributed points in mask B is, the closer to the optimum state the amplitude gets. In addition, the larger than 1 the ratio is, the closer to the excessive state the amplitude becomes. On the other hand, if the ratio of the number of distributed points in mask C to the number of distributed points in mask B is smaller to a certain extent than 1, the amplitude is closer to the optimum state. If it is closer to 1, the ratio is closer to a too small amplitude state. Using the relationship, the ratio is compared with a specified threshold, thereby determining whether or not there occurs an excessive amplitude or a too small amplitude.

Since the value of the ratio for determination of an excessive amplitude indicates no excessive amplitude when it is closer to 1, it is considered that the threshold is set to 1. Since the ratio for determination of a too small amplitude indicates a too small amplitude when the threshold is a value smaller to some extent than 1, a value smaller to some extent than 1 is to be set. The threshold smaller than 1 is obtained by changing the output amplitude of the ADC, and by measuring the bit error rate of an obtained signal, when a device is designed, thereby determining the level of the threshold which has no undesired influence on the bit error rate through an experiment.

Figure 8:
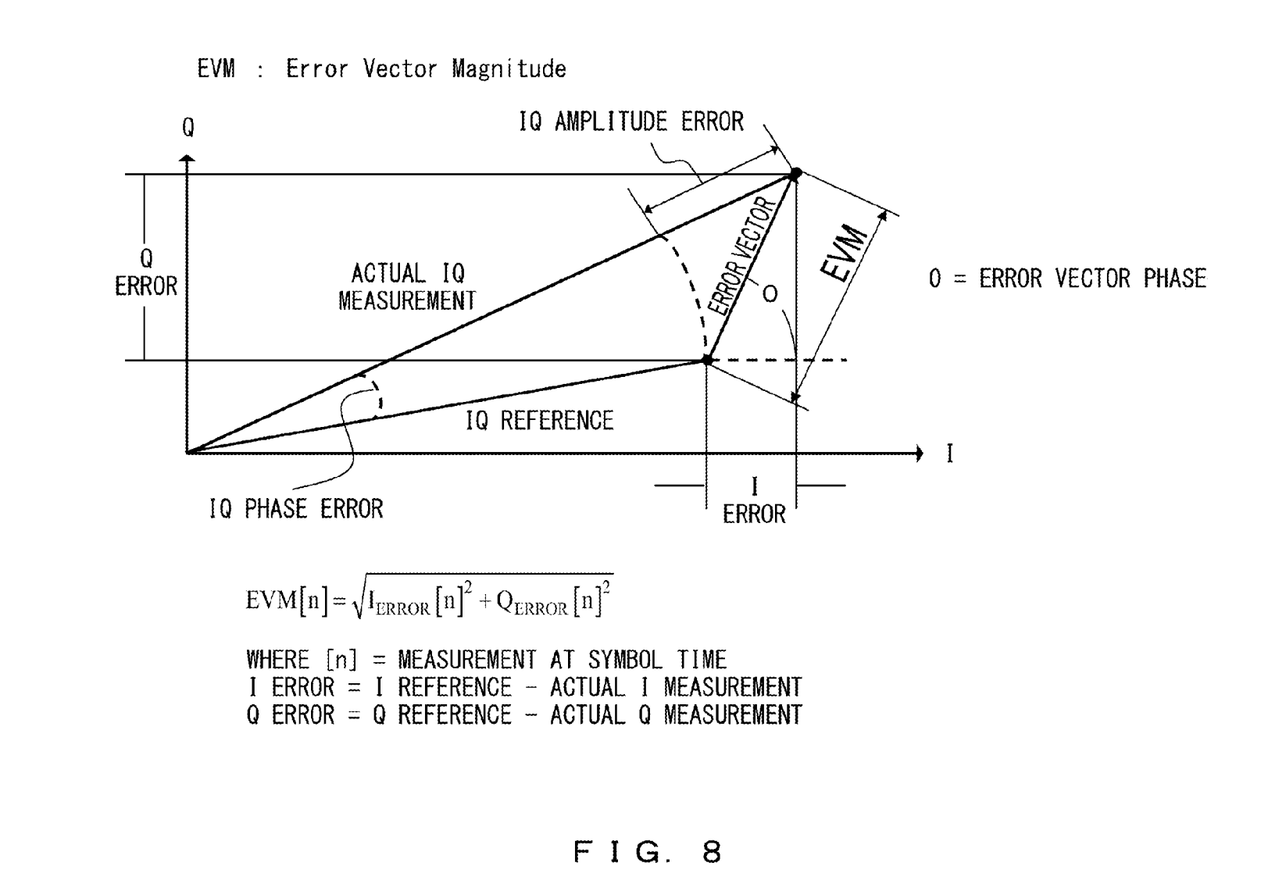
FIG. 8 is an example of the method of determining whether or not an A/D converted signal is in the optimum range on the constellation map.

FIG. 8 is an example of the method of determining whether or not an A/D converted signal is in the optimum range on the constellation map.

In this example, the method for determination using EVM (error vector magnitude) is described.

The EVM is calculated by calculating the constellation on the measurement signal, and by obtaining the difference (error vector) in vector between the measurement signal and the reference ideal signal. By obtaining the difference in vector, the amplitude direction of a measurement signal and the error in the phase direction may be expressed by numbers, and the signal quality of the measurement signal may be quantitatively expressed.

As illustrated in FIG. 8, the measurement signal (IQ actual measurement) and the reference ideal signal (IQ reference) are plotted on the IQ plane of the constellation, and the difference is defined as an error vector. The EVM of the n-th symbol is calculated as follows from the I component (I error (n)) and the Q component (Q error (n)) of the error vector.

$$\text{EVM}(n) = \sqrt{I\,\text{error}(n)^2 + Q\,\text{error}(n)^2} \,*(n) = \text{measurement at symbol time} \qquad [\text{Math 1}]$$

The larger the value of the EVM is, the larger the signal degradation becomes.

The amount of correction of the amplitude of the I and Q signals is obtained from the I and Q component of the error vector, and the amount of correction of the skew is obtained from the phase difference between the IQ actual measurement and the IQ reference.

Figure 9:
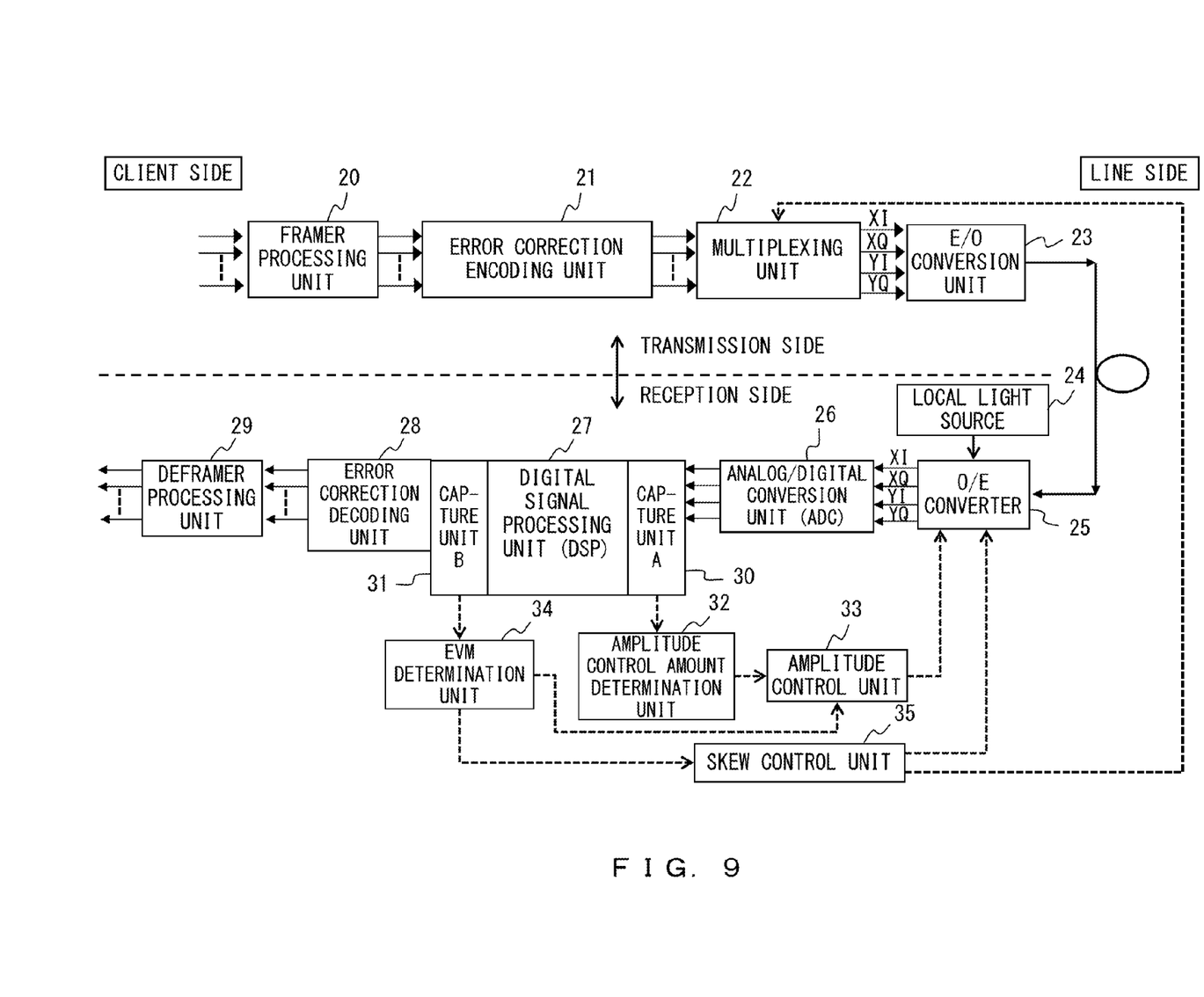
FIG. 9 is a block diagram of the digital optical coherent transmission system according to an embodiment of the present invention.

FIG. 9 is a block diagram of the digital optical coherent transmission system according to the present embodiment.

An example of a case in the DP-QPSK system is described below.

A framer processing unit 20 on the transmission side terminates the signal input from the client side. An encoding unit 21 adds an error correction code to the signal. A multiplexing unit 22 multiplexes a signal for associating the signal with the optical phase and the polarization, and generates I and Q signals for each of the X polarization and the Y polarization. An E/O conversion unit 23 is provided with an optical modulator etc. for performing electrical/optical conversion. A local light source 24 on the reception side generates local light for coherent detection. An O/E converter 25 is a configuration for optical/electrical conversion, and has the same configuration as the O/E converter 16 illustrated in FIG. 1. An analog/digital conversion unit (ADC) 26 digital-converts the input analog signal. A digital signal processing unit (DSP) 27 demodulates the signal by the digital signal processing. An error correction decoding unit 28 corrects an error of a signal from the added error correction code. A deframer processing unit 29 decomposes the frame and transmits the signal to the client side.

In addition, a capture unit A30 for extracting the IQ constellation after the A/D conversion is provided at the input stage of the DSP unit 27. A capture unit B31 for extracting the IQ constellation of the signal demodulated by the digital signal processing is also provided at the output stage of the DSP unit 27.

Based on the IQ constellation information (inter-signal variance) detected by the capture unit A30, an amplitude control unit 33 compensates for the signal amplitude at the output stage of the O/E converter 25 through an amplitude control amount determination unit 32. Since the O/E converter 25 normally has the function of adjusting the amplitude of the electric signal to be output in the circuit of converting an optical signal into an electric signal, the amplitude control unit 33 uses the function to adjust the amplitude of the output electric signal of the O/E converter 25.

Based on the IQ constellation information (inter-IQ skew information) detected in the capture unit B31, a skew control unit 35 performs inter-IQ skew compensation at the output stage of the O/E converter 25 and at the output stage of the multiplexing unit 22 on the transmission side through an EVM determination unit 34. In addition, the EVM determination unit 34 compensates for the amplitude error of the I and Q signals through the amplitude control unit 33. The EVM determination unit 34 calculates the above-mentioned error vector, calculates the amplitude error and the phase error of the I and Q signals, and provides the amplitude control unit 33 and the skew control unit 35 with the result of the calculation as an amount of correction, thereby correcting the amplitude and the skew. The correction of the skew is made by providing a delay element at the electric stage in the O/E converter 25 on the reception side and providing an appropriate delay for the electric signal. Similarly, a delay element is provided at the electric stage in the multiplexing unit 22 on the transmission side, and an appropriate delay is provided for the electric signal.

The IQ constellation information is acquired by holding the combination of the signal value of the I signal and the signal value of the Q signal as the coordinates of the I-Q plane in any of the capture unit A30 and the capture unit B31.

As an example of the method of transmitting the control signal for skew control from the skew control unit 35 on the reception side to the multiplexing unit 22 on the transmission side, it is considered to use the GCC (general communication channel) in an OTN (optical transport network) frame.

The capture unit A30 acquires the constellation information for detection as to whether or not the amplitude of the output signal of the ADC 26 is appropriate. However, the constellation information acquired by the capture unit A30 is a set of the information whose signal points have been variously rotated, expanded, and reduced in the I-Q plane due to the degradation etc. in the transmission line of a signal value. Therefore, it is determined as to whether or not the amplitude of the vector obtained from the I and Q signals of the signal value is appropriate relating to the constellation information at the capture unit A30. Then, the capture unit B31 is additionally provided. The capture unit B31 generates the constellation information with the signal value after the demodulation by the DSP 27. Since the constellation information uses the signal value after the demodulation, one signal point for each quadrant of the I-Q plane appears in the case of the QPSK. Therefore, by comparing the signal point with the position of the ideal signal point, the balance of the amplitude of the I and Q components and the phase error may be detected. Therefore, the constellation information about the capture unit A30 is used for appropriate correction of the output of the ADC 26 so that the demodulation at the DSP 27 may be correctly performed. On the other hand, the constellation information about the capture unit B31 is used for correction of the error of the amplitude and the skew for the improvement of the bit error rate at the reception end.

Figure 10:
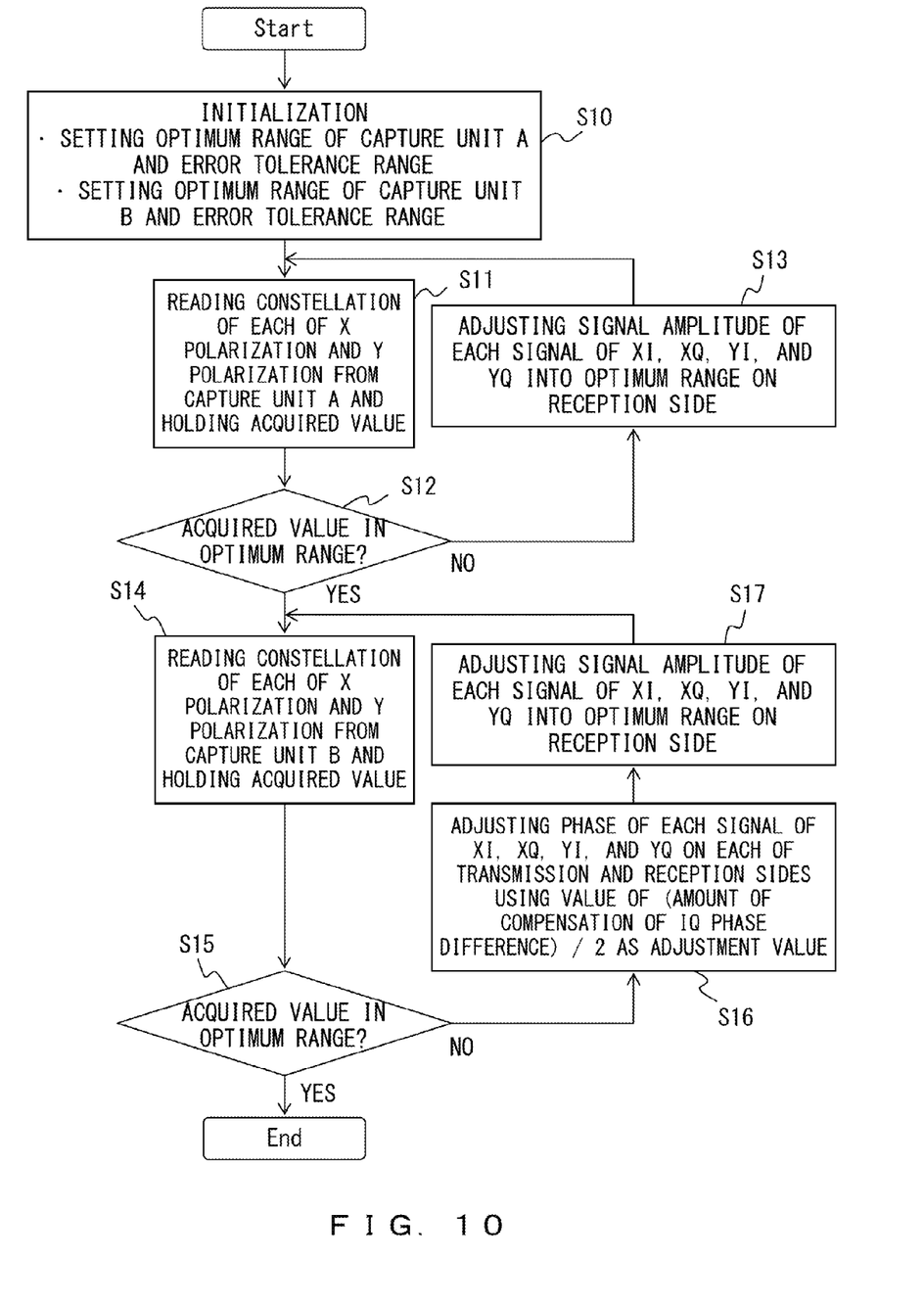
FIG. 10 is a flowchart of the entire process according to an embodiment of the present invention.

FIG. 10 is a flowchart of the entire process according to the present embodiment.

In this example, two polarization axes (X axis and Y axis) are orthogonal to each other.

First, in step S10, the optimum range and error tolerance range of each IQ constellation to be detected in the capture unit A30 and the capture unit B31 are set.

Next, in step S11, the IQ constellation of each of the X polarization and the Y polarization is extracted using the capture unit A30 is extracted, and is held as an acquired value. In step S12, it is determined using the determining method as illustrated in FIG. 7 whether or not the amplitude of the acquired value of each signal in the IQ constellation is in the preset optimum range. If it is determined in step S12 that the amplitude is not in the optimum range, then the compensation is performed through the amplitude control unit 33 so that the signal amplitude of the corresponding XI, XQ, YI, and YQ signals is in the optimum range. Then, back in step S11, it is repeatedly determined whether or not the extraction of constellation and each signal amplitude are in the optimum range.

When the amplitude compensation control is completed, and the determination in step S12 is YES, the IQ constellation of each of the X polarization and the Y polarization is extracted using the capture unit B31, and the result is held as an acquired value. In step S15, it is determined using the determining method as described with reference to FIG. 8 whether or not the inter-IQ skew of the acquisition value of each signal is in the preset optimum range. If the determination in step S15 is NO and it is not in the optimum range, then the compensation is performed in step S16 through the skew control unit 35 so that the amount of skew of the corresponding XI, XQ, YI, and YQ signals maybe in the optimum range. In this case, the amount of compensation of the phase difference of the IQ is expressed by a halved value, and the skew is compensated for by the halved value by the multiplexing unit 22 on the transmission side and the O/E converter 25 on the reception side. Next, in step S17, the signal amplitude at the output of the O/E converter 25 on the reception side is adjusted for the optimum range through the amplitude control unit 33 for each signal of XI, XQ, YI, and YQ, and then control is returned to step S14. The extraction of the constellation and the determination as to whether or not the inter-IQ skew of each signal is in the optimum range are repeated, and if the determination in step S15 is YES, the process terminates.

Figure 11:
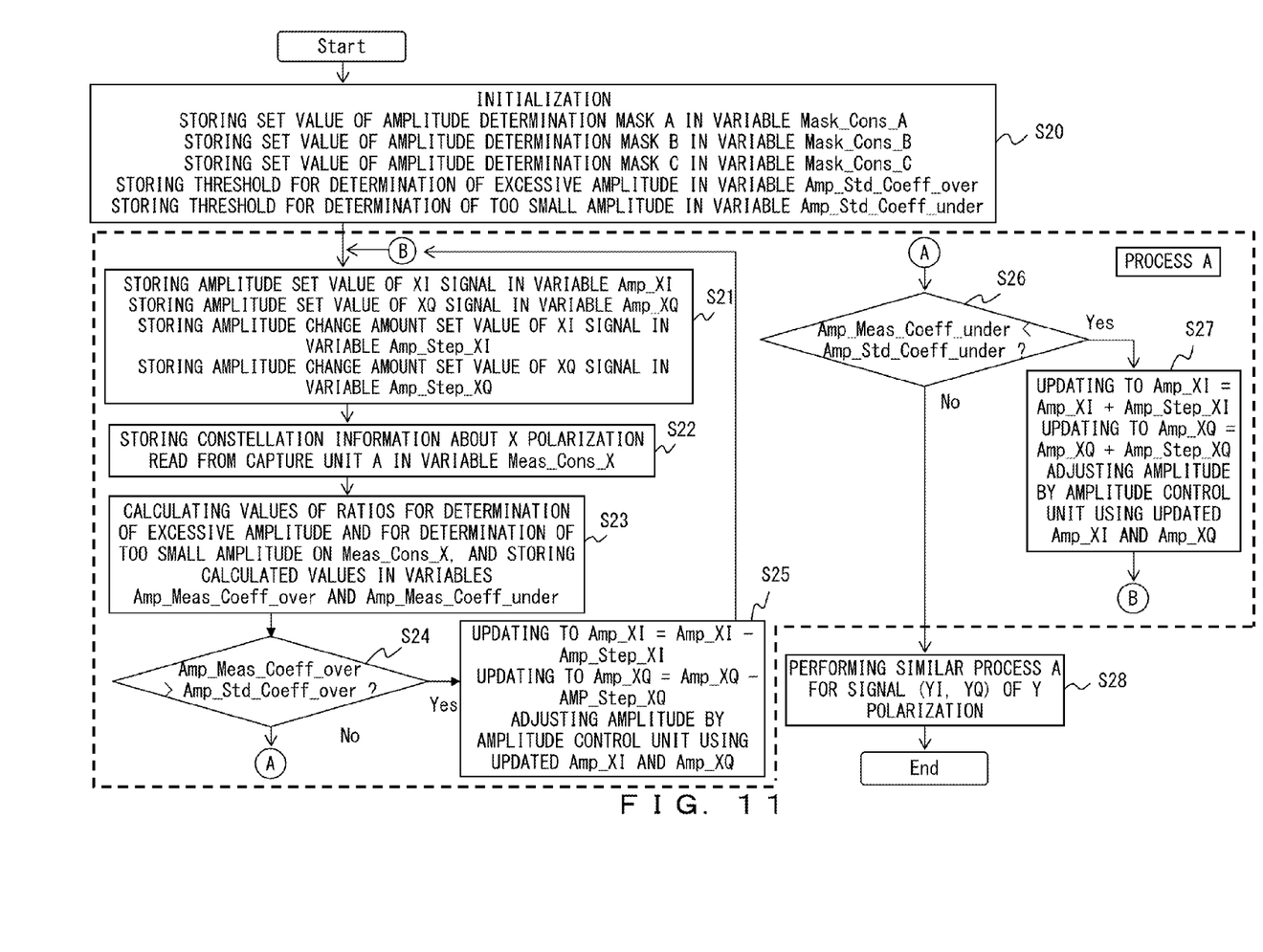
FIG. 11 is a flowchart of the process of the amplitude control amount determination unit in FIG. 9.

FIG. 11 is a flowchart of the process of the amplitude control amount determination unit in FIG. 9.

In step S20, as the initialization, the set value indicating the range of the amplitude determination mask A is stored in the variable Mask_Cons_A. The set value indicating the range of the amplitude determination mask B is stored in the variable Mask_Cons_B. The set value indicating the range of the amplitude determination mask C is stored in the variable Mask_Cons_C. The threshold for determination of excessive amplitude is stored in the variable Amp_Std_Coeff_over. The threshold for determination of too small amplitude is stored in the variable Amp_Std_Coeff_under.

First, the process is performed on the X polarization component. In step S21, the amplitude set value of the XI signal (set value for the output amplitude of the O/E converter 25) is stored in the variable AMP_XI. The amplitude set value of the XQ signal (set value for output amplitude of the O/E converter 25) is stored in the variable AMP_Step_XQ. The amplitude change amount set value of the XI signal is stored in the AMP_Step_XI. The amplitude change amount set value of the XQ signal is stored in the variable AMP_Step_XQ.

In step S22, the constellation information about the X polarization read from the capture unit A30 is stored in the variable Meas_Cons_X. In step S23, the number of signal points in each mask is counted on Meas_Cons_X using Mask_Cons_A, Mask_Cons_B, and Mask_Cons_C, thereby obtaining the two ratios described with reference to FIG. 7. The ratio for determination of excessive amplitude is stored in the variable Amp_Meas_Coeff_over. The ratio for determination of too small amplitude is stored in Amp_Meas_Coeff_under.

In step S24, it is determined whether or not Amp_Meas_Coeff_over is larger than Amp_Std_Coeff_over. If the determination in step S24 is YES, the set value is updated based on Amp_XI=Amp_XI−Amp_Step_XI, the set value is updated based on Amp_XI=Amp_XI−Amp_Step_XI, and the amplitude control unit amplitude-controls based on the updated Amp_XI and Amp_XQ in step S25. Then, back in step S21, the amplitude control is repeated. If the determination in step S24 is NO, then it is determined whether or not Amp_Meas_Coeff_under is smaller than Amp_Std_Coeff_under in step S26.

If the determination in step S26 is YES, the set value is updated based on Amp_XI=Amp_XI+Amp_Step_XI, and Amp_XQ=Amp_XQ+Amp_Step_XQ, and the amplitude control unit performs amplitude control based on the updated Amp_XI and Amp_XQ, and control is returned to step S21.

If the determination in step S26 is NO, the same process (process A) as steps S21 through S27 is performed on the Y polarization component in step S28, and the process terminates when the amplitude is appropriate.

Figure 12:
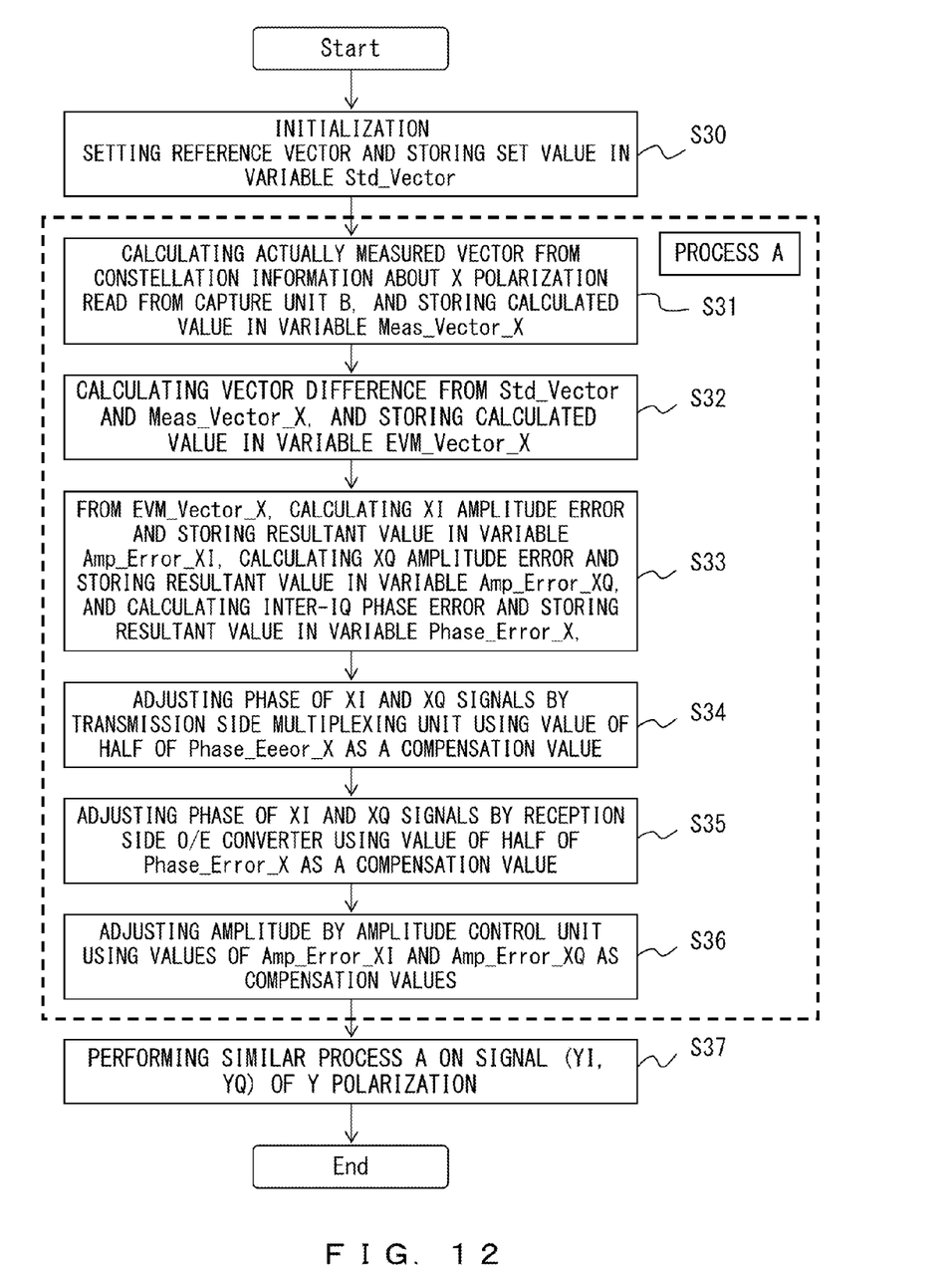
FIG. 12 is a flowchart of the process of the EVM determination unit in FIG. 9.

FIG. 12 is a flowchart of the process of the EVM determination unit in FIG. 9.

In step S30, as the initialization, the vector indicating the ideal signal point position is set as a reference vector, and stored in the variable Std_Vector.

First, the process is performed from the X polarization component. In step S31, according to the constellation information about the X polarization read from the capture unit B31, the actually measured vector is calculated, and stored in the variable Meas_Vector_X. In this example, for example, in the QPSK, four signal points appear on the I-Q plane.

However, as an actually measured vector, only the vector in the first quadrant is to be acquired. In this case, the reference vector is to be expected as a vector of the ideal signal point in the first quadrant.

In step S32, the vector difference is calculated by Std_Vector and Meas_Vector_X, and stored in the variable EVM_Vector_X. In step S33, the XI amplitude error is calculated from EVM_Vector_X, and stored in the variable Amp_Error_XI. In addition, the XQ amplitude error is calculated and stored in the variable Amp_Error_XQ. Furthermore, the inter-IQ phase error is calculated, and stored in the variable Phase_Error_X.

In step S34, the multiplexing unit 22 adjusts the phase of the XI and XQ signals using the half value of Phase_Error_X. In step S35, the O/E converter 25 on the reception side adjusts the phase of the XI and XQ signals using the half value of Phase_Error_X as the amount of compensation. In step S36, the O/E converter 25 performs amplitude control using the amplitude control unit 33 according to the values of Amp_Error_XI and Amp_Error_XQ as the amount of compensation, thereby passing control to step S37.

In step S37, the same process (process A) as in steps S31 through S36 is performed on the Y polarization signal, and the process terminates.

According to the present embodiment, the amplitude variance of each signal and the inter-IQ skew amount may be detected in each polarization unit according to the constellation information extracted from the capture unit. Using these parameters, the amplitude compensation or the inter-IQ skew compensation is performed, thereby successfully improving the performance of the digital optical coherent receiver.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A digital optical coherent transmission device in an optical transmission system using one of a multivalued modulation method and a frequency division multiplexing method, comprising:
    an O/E converter configured to optical-coherent receives a received optical signal and convert the optical signal into an electric signal;
    an analog/digital conversion unit configured to convert the electric signal from the O/E converter into a digital signal;
    a first constellation acquisition unit configured to acquire first constellation information for the output digital signal of the analog/digital conversion unit; and
    an amplitude control unit configured to control amplitude of the electric signal from the O/E converter when it is determined according to the first constellation information, that the amplitude of the output digital signal is not appropriate;
    a digital signal processing unit provided at a later stage of the first constellation acquisition unit and configured to demodulate a signal by performing digital signal processing on the output digital signal; and
    a second constellation acquisition unit configured to acquire second constellation information on a signal demodulated by the digital signal processing unit, wherein
    it is detected whether or not amplitude of the demodulated signal is appropriate according to the first constellation information, and when it is not appropriate, the amplitude control unit is directed to control amplitude of an electric signal from the O/E converter.

2. The device according to claim 1, further comprising a phase control unit configured to detect whether or not the phase of the demodulated signal is appropriate according to the second constellation information, and perform control so that the phase of the signal is appropriate when the phase is not appropriate.

3. The device according to claim 2, wherein the phase is controlled by adding a delay to an electric signal in the O/E converter.

4. The device according to claim 3, wherein the phase is controlled by adding a delay to an electric signal in a transmission device on a transmission side of an optical signal in addition to adding a delay to the electric signal in the O/E converter.

5. The device according to claim 4, wherein when phase control is performed on the transmission device on the transmission side, a phase control signal obtained according to the second constellation information is transmitted to the transmission device on the transmission side using a general communication channel (GCC) of an optical transport network (OTN) frame.

6. A method for performing control with a digital optical coherent transmission device in an optical transmission system using one of a multivalued modulation method and a frequency division multiplexing method, comprising:
    optical-coherent receiving a received optical signal and converting the optical signal into an electric signal;
    converting the electric signal from the electric signal converting step;
    acquiring first constellation information for the output digital signal in the digital conversion step; and
    controlling amplitude of the electric signal in the electric signal converting step when it is determined according to the first constellation information, that the amplitude of the output digital signal is not appropriate; wherein
    a signal is demodulated by performing digital signal processing on the output digital signal after the first constellation acquisition step;
    second constellation information is acquired on a signal demodulated by the signal demodulating step;
    it is detected according to the second constellation information whether or not amplitude of a demodulated signal is appropriate, and when the amplitude is not appropriate, amplitude of an electric signal from the electric signal converting step is controlled.

7. The method according to claim 6, wherein it is detected according to the second constellation information whether or not the amplitude of the demodulated signal is appropriate, and when the amplitude is not appropriate, the phase of the signal is controlled so that the phase is appropriate.

* * * * *